United States Patent
Brand et al.

(10) Patent No.: US 11,958,988 B2
(45) Date of Patent: Apr. 16, 2024

(54) FLUORINE FREE ANTI-STICK COATING AND METHOD FOR ITS PRODUCTION

(71) Applicant: Industrielack AG, Wangen (CH)

(72) Inventors: Joerg Brand, Buttikon (CH); Hans Georg Geisel, Siebnen (CH); Stephanie Raisch, Schindellegi (CH); Remo Huber, Siebnen (CH)

(73) Assignee: INDUSTRIELACK AG, Wangen (CH)

( * ) Notice: Subject to any disclaimer, the term of this patent is extended or adjusted under 35 U.S.C. 154(b) by 0 days.

(21) Appl. No.: 17/466,579

(22) Filed: Sep. 3, 2021

(65) Prior Publication Data

US 2022/0073785 A1    Mar. 10, 2022

(30) Foreign Application Priority Data

Sep. 4, 2020 (EP) .................................. 20194537

(51) Int. Cl.
*A47J 36/04* (2006.01)
*A47J 36/02* (2006.01)
(Continued)

(52) U.S. Cl.
CPC .......... *C09D 181/06* (2013.01); *A47J 36/025* (2013.01); *A47J 36/04* (2013.01); *B05D 3/0254* (2013.01);
(Continued)

(58) Field of Classification Search
CPC ....... A47J 36/025; A47J 36/04; C09D 171/00; C09D 181/04–10; C09D 183/04–08;
(Continued)

(56) References Cited

U.S. PATENT DOCUMENTS

| | | | |
|---|---|---|---|
| 3,423,479 A | 1/1969 | Hendricks | |
| T937,005 I4 * | 8/1975 | Vasta | A47J 36/02 525/474 |

(Continued)

FOREIGN PATENT DOCUMENTS

| | | |
|---|---|---|
| CH | 709779 A2 | 12/2015 |
| DE | 102006061940 A1 | 7/2008 |

(Continued)

OTHER PUBLICATIONS

Machine translation of DE 102014011060 A1.*

(Continued)

*Primary Examiner* — Z. Jim Yang
(74) *Attorney, Agent, or Firm* — Agris & von Natzmer LLP; Joyce von Natzmer

(57) ABSTRACT

Disclosed is a non-stick coating for an article, particularly for a baking pan or other household and utility item, comprises at least a base layer (G) burnt onto a surface (O) of the article and a covering layer (D) burnt above the base layer. The base layer and the covering layer each have a dry film thickness of 1 to 25 μm, wherein the base layer contains 10 to 100 wt.-%, related to the weight of the burnt base layer, of a thermoplastic resin having a temperature resistance exceeding 200° C., and wherein the covering layer contains a thermoplastic resin having a temperature resistance exceeding 200° C. and optionally a silicone resin. Both the base layer and also the covering layer are free of perfluorinated and polyfluorinated alkyl compounds. Due to the fact that the covering layer comprises a content of thermoplastic resin of at least 30 wt.-%, related to the weight of the burnt covering layer, and of at least 2.5 wt.-%, related to the weight of the burnt covering layer, of a silicone oil, novel fluorine-free non-stick coatings with good substrate adhesion and very good deep-drawing properties are obtained. In a process for applying the non-stick coating, the base layer (Continued)

to be formed is applied as a liquid varnish onto the surface of the article and subsequently dried at 250 to 440° C., subsequently the covering layer is applied as liquid varnish onto the predried base layer, and finally the layers are bonded to each other and to the surface of the article by means of heat treatment at 250 to 440° C.

20 Claims, 2 Drawing Sheets

(51) Int. Cl.
    *B05D 3/02*     (2006.01)
    *B05D 7/00*     (2006.01)
    *C09D 5/00*     (2006.01)
    *C09D 7/40*     (2018.01)
    *C09D 7/61*     (2018.01)
    *C09D 7/65*     (2018.01)
    *C09D 181/04*     (2006.01)
    *C09D 181/06*     (2006.01)

(52) U.S. Cl.
    CPC .............. *B05D 7/544* (2013.01); *C09D 5/002* (2013.01); *C09D 7/61* (2018.01); *C09D 7/65* (2018.01); *C09D 7/70* (2018.01); *C09D 181/04* (2013.01)

(58) Field of Classification Search
    CPC .......... C08L 81/02; C08L 81/04; C08L 81/06; C08L 81/08; B32B 27/283; B32B 27/286; B32B 27/288
    See application file for complete search history.

(56) References Cited

U.S. PATENT DOCUMENTS

| | | | |
|---|---|---|---|
| 3,929,708 A | 12/1975 | Brady et al. | |
| 4,021,395 A | 5/1977 | Vary | |
| 4,180,613 A * | 12/1979 | Vassiliou | C09D 183/04 427/388.5 |
| 4,623,565 A * | 11/1986 | Huybrechts | A47J 36/04 428/447 |
| 5,721,053 A | 2/1998 | Thomas | |
| 6,423,417 B1 | 7/2002 | Robbins | |
| 2005/0025900 A1 | 2/2005 | Cavero | |
| 2006/0079620 A1 | 4/2006 | Greene et al. | |
| 2008/0311382 A1 | 12/2008 | Stecher | |
| 2012/0034448 A1* | 2/2012 | Liu | B05D 5/083 428/325 |
| 2017/0130060 A1 | 5/2017 | Krishnan et al. | |
| 2017/0183498 A1 | 6/2017 | Sperindio et al. | |
| 2018/0187029 A1 | 7/2018 | Sperindio et al. | |
| 2020/0077836 A1* | 3/2020 | Park | H05B 6/80 |
| 2020/0216669 A1 | 7/2020 | Sperindio et al. | |
| 2022/0389155 A1* | 12/2022 | Jepson | A47J 36/025 |
| 2023/0046549 A1* | 2/2023 | Poland | C08G 77/80 |

FOREIGN PATENT DOCUMENTS

| | | | |
|---|---|---|---|
| DE | 102014011060 A1 * | 1/2016 | B32B 15/08 |
| EP | 2177580 B1 | 1/2011 | |
| EP | 2319631 B1 | 3/2014 | |
| EP | 2450469 B1 | 10/2014 | |
| EP | 3272254 A1 * | 1/2018 | A47J 27/00 |

OTHER PUBLICATIONS

Ellis et al., Thermolysis of fluoropolymers as a potential source of halogenated organic acids in the environment, Nature, vol. 412, p. 321-24, Jul. 19, 2001.
"Conference Papers: Silicones in Coatings", Finzel, W., 2nd Conference in the Series: High Performance Coating Materials, Brussels, 1996, S. 2-7 ("E5" of Weilburger Opposition).
"Kittel—textbook of paints and coatings", Streitberger, Hans-Joachim [ed.], Hirzel publishing house, Stuttgart/Leipzig, 2008, vol. 6, 2nd edition, pp. 178-180 (original: "Kittel—Lehrbuch der Lacke und Beschichtungen", Streitberger, Hans- Joachim [Hrsg.], Verlag Hirzel, Stuttgart/Leipzig, 2008, Bd. 6, 2. Aufl., S. 178-180) ("E7" of Weilburger opposition).
"Paint additives", Bieleman, Johan [ed.], WILEY-VCH, Weinheim, 2004, pp. 134/135 and pp. 146-149 (original: "Lackadditive", Bieleman, Johan [Hrsg.], WILEY-VCH, Weinheim, 2004, S. 134/135 und S. 146-149) ("E2" of Weilburger Opposition).
"Dossier—Silicones", Birgit Geueke, Food Packing Forum, May 2015 (original: "Dossier—Silicones", Birgit Geueke, Food Packing Forum, Mai 2015) ("E4" of Weilburger Opposition).
"Kittel—textbook of paints and coatings", Streitberger, Hans-Joachim [ed.], Hirzel publishing house, Stuttgart/Leipzig, 2008, vol. 6, 2nd edition, pp. 522-526 (original: "Kittel—Lehrbuch der Lacke und Beschichtungen", Streitberger, Hans-Joachim [Hrsg.], Verlag Hirzel, Stuttgart/Leipzig, 2008, Bd. 6, 2. Aufl., S. 522-526) ("E3" of Weilburger Opposition).
"Temperature-resistant coating systems made from polymers for frying, cooking and baking equipment," BfR—Federal Institute for Risk Assessment, 2019 (original: "Temperaturbeständige Beschichtungssysteme aus Polymeren für Brat-, Kochund Backgeräte", BfR—Bundesinstitut für Risikobewertung"E6" of Weilburger Opposition).
A.H. Ross: "New Materials from Renewable Sources in the Development of a Non-Stick Coating for Bakeware", Ph.D. Thesis, University of Warwick, Sep. 2015 ("D5" of PPG opposition).
Opposition by PPG Industries, Inc. against European Patent No. 3964300 of Industrielacke AG, citing references D1 to D14 submitted herewith (hereinafter "PPG opposition") (Notice of Opposition sent to applicant on Jan. 3, 2024, opposition filed on Dec. 20, 2023).
Opposition by Weilburger Coatings GmbH, Ahäuser Weg 12-22, 35781 Weilburg, Germany against European Patent No. 3964300 of Industrielacke AG, citing references E1 (EP2319631, on record) to E9, with E2-E10 submitted herewith (German original and English translation provided, hereinafter "Weilburger opposition") (Notice of Opposition sent to applicant on Jan. 3, 2024, opposition filed on Dec. 20, 2023).
Silicones, BfR—Federal Institute for Risk Assessment, Jan. 1, 2012 (translation of German document issued by the Bundesinstitut für Risikobewertung) ("E10" of Weilburger opposition).
Wikipedia—"Polydimethylsiloxane" (original: Wikipedia—"Polydimethylsiloxan") (Jul. 31, 2023) ("E9" of Weilburger opposition).
Abstract of UST937004 I4 as submitted as "D12 "with PPG opposition (underlying defensive publication was published Aug. 1975).

* cited by examiner

FLUORINE FREE ANTI-STICK COATING AND METHOD FOR ITS PRODUCTION

CROSS-REFERENCE TO RELATED APPLICATIONS

This application claims priority to European patent application no. EP 20194537.5, filed Sep. 4, 2020 and which is incorporated herein by reference in its entirety.

TECHNICAL FIELD

The present invention relates to a fluorine-free non-stick coating, a method for its production and an article provided with the same.

PRIOR ART

From the prior art, non-stick coatings based on fluoropolymers have been known for a long time, for example for coating baking pans. In this context, polytetrafluoroethylene (PTFE) is a very commonly used fluoropolymer. PTFE coatings have very good non-stick properties due to their low surface energy and they have high temperature resistance due to their high C—F bonding energies.

Baking pans are usually produced by means of a coil coating process and a subsequent forming process (deep drawing).

In addition to the good non-stick properties, PTFE coatings generally exhibit low friction coefficients, which has an advantageous effect on the deep-drawing suitability of such coatings. Without the dry lubrication effect of PTFE during the forming process, the sheet would crack during deep drawing.

In addition to the advantages mentioned above, however, fluoropolymer coatings have a number of disadvantages. Due to its extremely high melt viscosity, PTFE can only be processed at very high temperatures. The burning temperatures used for this purpose are around 420° C. This processing temperature is above the decomposition temperature of PTFE, whereby toxic and aggressive decomposition products (such as trifluoroacetic acid and fluorophosgene) are released (Nature, Vol. 412, 19, July 2001, p. 321-324). In the production of fluoropolymers, fluorine-containing wetting agents are also frequently used, which can accumulate in the environment due to their lack of biodegradability and which can also endanger human health and the environment.

During the deep drawing process of PTFE coatings, there may also occur an undesirable surface abrasion of the coating, which is visible on the later article, particularly if the content of soft PTFE on the surface is high.

Fluorine-free non-stick coatings are also known from the prior art.

Silicone-modified polyesters, in which a part of the polyester is modified by silicones, often show a lack of temperature resistance, since the polyester portion burns easily at high temperatures (>230° C.). In order to achieve a sufficient deep drawing capability of the silicone-modified polyester, the proportion of silicone modification must be kept low so that a sufficient substrate adhesion and flexibility can be achieved for the deep drawing process. This has a disadvantageous effect on the anti-adhesion effect and temperature stability. For this reason, silicone-modified polyesters are used exclusively in spray applications and not in the much more efficient coil coating processes.

Finally, fluorine-free non-stick coatings which are produced by the sol-gel process are known from the prior art, e.g. from EP 2 177 580 B1. These coatings are very temperature-resistant, but are also very hard and brittle. Therefore, these non-stick coatings, which are often also referred to as ceramic coatings, are also not suitable for coil coating processes with a subsequent forming process.

EP 2 450 469 B1 does describe a manufacturing process in which a sol-gel coating is applied to a substrate, dried at 70±10° C. for 6 to 8 minutes, then formed and subsequently fully crosslinked. However, the pre-dried coating is not suitable for industrial coil coating processes because the pre-dried coating is very susceptible to mechanical damage and the pre-drying conditions are difficult to control.

US20200216669A1 describes a fluorine-free sol-gel coating composition, which further comprises a thermoplastic polymer (such as PPS) having a melting point or glass transition temperature of 200° C. or more. This results in an improved impact resistance. However, the achieved flexibility of the coating is far too low for a deep drawing process.

EP 2 319 631 B1 describes a coating for a substrate having a base layer on the substrate, wherein the base layer comprises a binder matrix selected from the group consisting of silicone resin, titanate, zirconate and mixtures thereof, wherein the binder matrix contains a proportion of 0.5 to 20 wt.-%, related to the weight of the base layer, of a thermoplastic resin having a temperature resistance of above 200° C. The base layer is free of fluoropolymers and is tempered at a temperature between 150° C. and 230° C., wherein a covering layer is arranged onto the base layer, which contains a binder matrix with a smaller proportion of a thermoplastic resin than the base layer. The proportion of the thermoplastic resin in the binder matrix of up to 20 wt.-% is quite low here, and the coating is only tempered at up to 230° C. in order to avoid decomposition of the silicone resin.

From the prior art there are also known silicone elastomers and silicone resins, which can be used as non-stick materials. However, these have the disadvantage that they build up only a low adhesion to the substrate and are therefore not suitable for a subsequent forming process. The temperature-resistant silicone resins are also very brittle and show sufficient adhesion only on mechanically roughened surfaces.

DESCRIPTION AND SUMMARY OF THE INVENTION

It is an object of the present invention to provide a fluorine-free non-stick coating that overcomes the disadvantages of the prior art. In particular, the coating should allow for a good adhesion to ECCS (electrolytic chromium/chromium oxide coated steel) and exhibit a high flexibility suitable for a subsequent deep drawing process. In this context, a coating should be provided that is free of perfluorinated and polyfluorinated alkyl compounds and, in particular, completely avoids fluoropolymers, in particular polytetrafluoroethylene (PTFE).

A further object of the invention is to provide a method for applying the non-stick coating according to the present invention.

These objects are achieved by the non-stick coating defined in claim 1 and the method defined in claim 9.

Another aspect of the present invention relates, according to claim 15, to a coated article having a surface which is provided with a non-stick coating according to the present invention. This can be, in particular, a baking pan or other household and utility item.

The non-stick coating according to the present invention comprises at least a base layer (G) burnt onto a surface of the article and a covering layer burnt above the base layer, wherein the base layer has a dry film thickness of 1 to 25 µm, and wherein the covering layer has a dry film thickness of 1 to 25 µm. The base layer contains 10 to 100 wt.-%, related to the weight of the burnt base layer, of a thermoplastic resin having a temperature resistance exceeding 200° C., and the covering layer also contains a thermoplastic resin having a temperature resistance exceeding 200° C. and optionally a silicone resin. Both the base layer and also the covering layer are free of perfluorinated and polyfluorinated alkyl compounds. According to the invention, the covering layer comprises a content of thermoplastic resin of at least 30 wt.-%, related to the weight of the burnt covering layer, and of at least 2.5 wt.-%, related to the weight of the burnt covering layer, of a silicone oil.

The terms "burnt base layer" and "burnt covering layer" are to be understood in such manner that for producing the said layers a corresponding heat treatment at a temperature between 250 and 440° C. was carried out.

Compared with the prior art, the non-stick coating according to the present invention allows to obtain novel fluorine-free non-stick coatings with good adhesion on ECCS (electrolytic chromium/chromium oxide coated steel) and very good deep-drawing properties, which in baking tests in combination with dishwashing show improved cleaning and demolding behavior of the test cake compared with PTFE-containing non-stick coatings.

In the method according to the present invention, the base layer to be formed is applied as a liquid varnish onto the surface of the article and subsequently dried at 250 to 440° C., subsequently the covering layer is applied as liquid varnish onto the pre-dried base layer, and the layers are bonded to each other and to the surface of the article by means of subsequent heat treatment at 250 to 440° C.

Surprisingly, it has been found that the covering layer according to the present invention comprising only 2.5 wt.-% of a silicone oil already provides coatings that are very suitable for deep-drawing without tearing and that do not require the use of a dry lubricant such as PTFE. The deep-drawn surfaces do not show any undesirable surface abrasion of the coating by the forming tools, which is visible on the later article, as is sometimes the case with PTFE-containing non-stick coatings.

Moreover, it has been surprisingly found that even high burning temperatures between 250 and 440° C. do not negatively affect the non-stick effect of the silicones used in the non-stick coating according to the present invention.

Advantageous embodiments of the invention are defined in the dependent claims.

In principle, for the application according to the present invention various silicone oils are available and are also commercially available. In particular, they may be reactive or nonreactive silicone oils. For the intended applications in the food sector, the silicone oil contained in the covering layer should have a kinematic viscosity at 20° C. of at least 100 $mm^2s^{-1}$ (claim 2). According to one embodiment, the silicone oil used is an α,ω-hydroxy terminated polydimethylsiloxane.

It is advantageous if the covering layer additionally contains one or more silicone resins (claim 3). Suitable silicone resins are, in particular, methyl silicone resins and/or phenyl silicone resins and/or methyl phenyl silicone resins (claim 4).

The thermoplastic resin contained in the base layer and in the covering layer, respectively, is independently selected from the group consisting of polyethersulfone (PES), polyphenylene ether sulfone (PPSU), liquid crystalline polymer (LCP), polyarylether ketone, polyether ketone (PEK), polyether ether ketone (PEEK), polyether clay ketone (PEKK), polyphenylene sulfide (PPS) and mixtures thereof (claim 5). A particularly advantageous thermoplastic material for the present invention is PES.

In certain embodiments, the base layer and/or the covering layer contains at least one additive selected from the group consisting of pigments, fillers and metallic particles (claim 6). This can be, in particular, aluminum flakes (so called. "flakes"), mica or carbon black. However, there are also embodiments in which the base layer and/or the covering layer are free of pigments and particles.

According to an advantageous embodiment, the dry film thickness of the base layer as well as that of the covering layer is 3 to 4 µm (claim 7).

In certain embodiments, the same thermoplastic resin, for example PES, is used for the base layer and for the covering layer. However, for certain applications it can be provided that the covering layer contains a different thermoplastic resin than the base layer (claim 8).

In an embodiment of the method according to the present invention, the varnish used to form the base layer or the covering layer contains the thermoplastic resin in the form of a dispersion (claim 10).

In a further embodiment, the varnish used to form the base layer or the covering layer contains the thermoplastic resin in a dissolved form (claim 11).

In principle, the method according to the present invention can be used for articles with different types of surfaces. In an advantageous embodiment, the surface of the article is metallic (claim 12).

According to a particularly advantageous embodiment, the varnishes used to form the base layer and the covering layer are applied by means of a coil coating process (claim 13).

In principle, the method according to the present invention can be used for coating articles which are already in a finished form. In an advantageous embodiment, however, the article and thus also the non-stick coating applied thereto are subjected to a forming process after the heat treatment (claim 14), in particular by means of deep drawing.

BRIEF DESCRIPTION OF THE DRAWINGS

Examples of the invention will henceforth be described in more detail by reference to the drawings, wherein are shown.

MODES FOR CARRYING OUT THE INVENTION AND DESCRIPTION OF VARIOUS AND PREFERRED EMBODIMENTS

Figure 1:
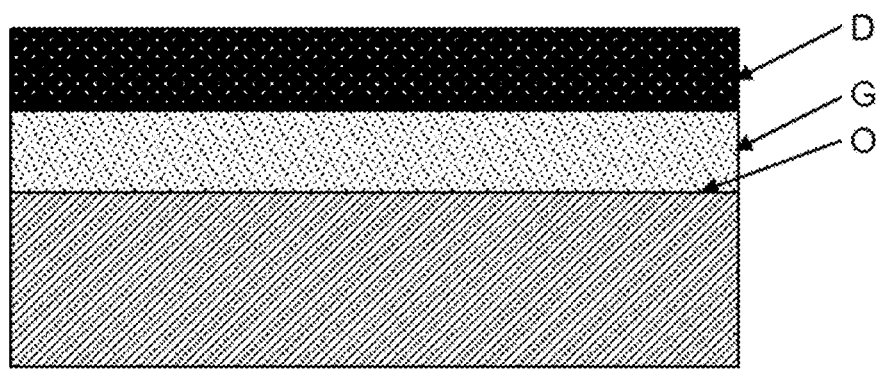
FIG. 1 a layer structure of a non-stick coating according to the present invention, as a schematic sectional view.
Figure 2:
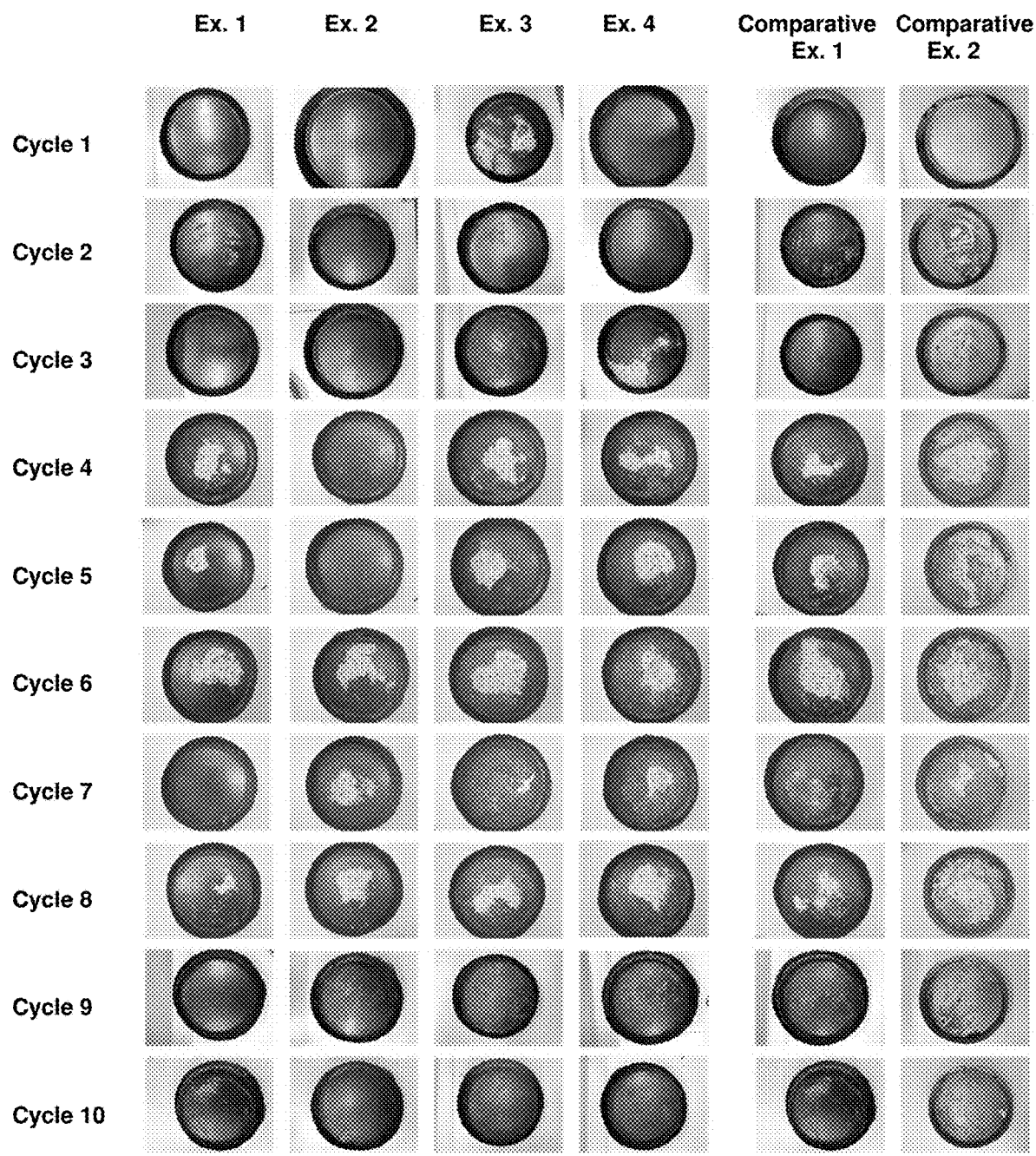
FIG. 2 round shapes of the exemplary embodiments 1-4 and of the comparative examples 1 and 2, each after a certain number of baking cycles (cleaning in dishwasher after cycle 1, 3, 5, 7 and 9).

The non-stick coating shown in FIG. 1 for the surface O of an article, which is for example a baking pan, comprises a base layer G burnt onto a surface O and a covering layer (D) burnt above the base layer G.

EXAMPLES

According to a particularly preferred exemplary embodiment 1, a non-stick coating, in particular for bakeware, comprises two layers, namely a covering layer having a dry film thickness of 3 to 4 µm and a base layer having a dry film thickness of 3 to 4 µm.

The base layer in this particularly preferred exemplary embodiment 1 contains 85.1 wt.-% polyethersulfone, 8 wt.-% aluminum flakes, 4.3 wt.-% mica and 2.6 wt.-% carbon black.

The covering layer in this particularly preferred exemplary embodiment 1 contains 72.5 wt. % polyethersulfone, 10.4 wt.-% of a methyl phenyl silicone resin, 1.3 wt.-% of a methyl silicone resin, 3.1 wt.-% of a silicone oil consisting of an α,ω-hydroxy terminated polydimethylsiloxane, 6.9 wt.-% aluminum flakes, 3.6 wt.-% mica and 2.2 wt.-% carbon black.

The base layer is applied in liquid form onto a grease-free ECCS sheet with a thickness of 0.29 mm by means of a spreading knife and burned in for 30 seconds at 150° C. and subsequently burned in for 1 minute at 420° C. and then cooled to room temperature. The covering layer is applied onto the dried base layer by means of a spreading knife and burned in for 30 seconds at 150° C. and subsequently burned in for 1 minute at 320° C.

According to another exemplary embodiment 2, a non-stick coating, in particular for bakeware, comprises two layers, namely a non-pigmented covering layer having a dry film thickness of 3 to 4 µm and a base layer having a dry film thickness of 3 to 4 µm.

The base layer in this exemplary embodiment 2 contains 85.1 wt.-% polyethersulfone, 8 wt.-% aluminum flakes, 4.3 wt.-% mica and 2.6 wt.-% carbon black.

The covering layer in this exemplary embodiment 2 contains 85 wt.-% polyethersulfone, 11.5 wt.-% of a methyl phenyl silicone resin and 3.5 wt.-% of a silicone oil consisting of an α,ω-hydroxy terminated polydimethylsiloxane.

The base layer is applied in liquid form onto a grease-free ECCS sheet with a thickness of 0.29 mm by means of a spreading knife and burned in for 30 seconds at 150° C. and subsequently burned in for 1 minute at 420° C. and cooled to room temperature. The covering layer is applied onto the dried base layer by means of a spreading knife and burned in for seconds at 150° C. and subsequently burned in for 1 minute at 320° C.

According to a further exemplary embodiment 3, a non-stick coating, in particular for bakeware, comprises two layers, namely a covering layer having a dry film thickness of 3 to 4 µm and a base layer having a dry film thickness of 3 to 4 µm.

The base layer in this exemplary embodiment 3 contains 85.1 wt.-% polyethersulfone, 8 wt.-% aluminum flakes, 4.3 wt.-% mica and 2.6 wt.-% carbon black.

The non-pigmented covering layer in this exemplary embodiment 3 contains 96.1 wt.-% polyethersulfone and 3.9 wt.-% of a silicone oil consisting of an α,ω-hydroxy terminated polydimethylsiloxane.

The base layer is applied in liquid form onto a grease-free ECCS sheet with a thickness of 0.29 mm by means of a spreading knife and burned in for 30 seconds at 150° C. and subsequently burned in for 1 minute at 420° C. and cooled to room temperature. The covering layer is applied onto the dried base layer by means of a spreading knife and burned in for seconds at 150° C. and subsequently burned in for 1 minute at 320° C.

According to a further exemplary embodiment 4, a non-stick coating, in particular for bakeware, comprises two layers, namely a covering layer having a dry film thickness of 3 to 4 µm and a base layer having a dry film thickness of 3 to 4 µm.

The base layer in this exemplary embodiment 4 contains 85.1 wt.-% polyethersulfone, 8 wt.-% aluminum flakes, 4.3 wt.-% mica and 2.6 wt.-% carbon black.

The covering layer in this exemplary embodiment 4 contains 80.9 wt.-% polyethersulfone, 7.7 wt.-% aluminum flakes, 4.1 wt.-% mica, 2.5 wt.-% carbon black, 1.4 wt.-% of a methyl silicone resin and 3.5 wt.-% of a silicone oil consisting of an α,ω-hydroxy terminated polydimethylsiloxane.

The base layer is applied in liquid form onto a grease-free ECCS sheet with a thickness of 0.29 mm by means of a spreading knife and burned in for 30 seconds at 150° C. and subsequently burned in for 1 minute at 420° C. and cooled to room temperature. The covering layer is applied onto the dried base layer by means of a spreading knife and burned in for 30 seconds at 150° C. and subsequently burned in for 1 minute at 320° C.

The comparative example 1 is a single-layer fluoropolymer-containing non-stick coating having the following composition: 77.8 wt.-% polyethersulfone, 3.9 wt.-% mica, 2.3 wt.-% carbon black, 8.6 wt.-% PTFE, 7.4 wt.-% aluminum flakes.

The layer is applied in liquid form onto a grease-free ECCS sheet with a thickness of 0.29 mm by means of a spreading knife and burned in for 30 seconds at 150° C. and subsequently burned in for 1 minute at 420° C.

The comparative example 2 is a single-layer non-stick coating of a modified silicone polyester having the following composition: 70.6 wt.-% of a silicone-modified polyester, 2 wt.-% of a pyrogenic silica, 2 wt.-% of a rheology additive made from organically modified bentonite clay, 0.1 wt.-% carbon black, 1.5 wt.-% of an ultramarine pigment, 16.1 wt.-% barium sulfate filler, 4.1 wt.-% v and 3.9 wt.-% of an unreactive silicone oil.

For the combined baking and dishwashing test of comparative example 2 described below a round shape made of grease-free ECCS sheet with a thickness of 0.29 mm was first pressed and subsequently varnished by a spraying process for 30 seconds at 150° C. and subsequently burned in for 1 minute at 420° C., since this coating is not deep-drawable.

Properties of the Coatings:

Square molds with a size of 26×26 mm were drawn to approximately 60 mm (#05030132) from the burnt non-stick coatings according to the present invention with the help of an Erichsen thermoforming testing machine model 212 (sheet holding force 8-9 kN, drawing speed 4-5, drawing punch travel approximately 60 mm, drawing force maximum 11 kN), in order to evaluate the deep-drawing suitability. The surfaces of the deep drawing testing machine that come into contact with the sheet during deep drawing were previously degreased with ethyl acetate.

No delamination or loss of adhesion were found with any of the non-stick coatings according to the present invention. Moreover, no superficial color changes or abrasions were observed on any of the non-stick coatings of the present invention. Therefore, all non-stick coatings of the present invention have very good thermoforming properties.

Combined Baking and Dishwashing Test:

In addition, round molds with a diameter of 22.5 cm and a depth of 4 cm were pressed from the embodiments according to the present invention and the comparison examples, in order to be able to perform a baking test in combination with dishwashing.

The Following Dough Recipe was Used for the Test Cake:

200 g butter, 200 g sugar, 1 pinch of vanilla sugar and 1 pinch of salt are stirred to a creamy blend. Gradually, 4 eggs, 300 g of flour and 3 teaspoons of baking powder are added while stirring. All the ingredients are stirred together to form a uniform dough mixture.

A convection oven is preheated to 180° C. 200 g of cake batter are poured into the ungreased round pan and spread evenly in the pan. The batter is baked for 20 minutes. The baking pan is removed from the oven and cooled for 8 minutes. The baking pan is inverted and the cake is unmolded. For this purpose, it may be necessary to drop the pan upside down onto the table. It is noted how easily the cake can be demolded. The amount of residue remaining is also noted. Subsequently, the baking pan is washed by hand with dishwashing detergent and dried thoroughly. The cleanability is assessed and noted.

A total of 10 cycles are baked, with cleaning in the dishwasher after the 1st, 3rd, 5th, 7th and 9th cycle. After each cycle, a picture is taken of the round mold after the cake is demolded.

When evaluating the demolding of the cake and the cleanability of the round mold after each cycle, a maximum of 10 points can be awarded per cycle, resulting in a maximum of 100 points after 10 cycles. Thereby, the demolding of the cake is weighted by a factor of 0.6 and the cleanability of the round mold by a factor of 0.4.

The Demolding of the Cake is Rated as Follows:
no sticking, the cake demolds very easily, 0-5% residue, is scored as 10 points
sporadic sticking, the cake demolds easily, 5-20% residue, is scored as 7.5 points
strong sticking, the cake can be demolded, 20-40% residue, is scored as 5.0 points
strong sticking, cake can only be demolded with a dough scraper, is scored as 2.5 points The Cleanability of the Round Mold is Rated as Follows:
no residues is scored as 10 points
light (light pressure) is scored as 7.5 points
moderate (medium pressure) is scored as 5.0 points
cleaning sponge necessary is scored as 2.5 points Table 1 shows the evaluation of the individual cycles of the combined baking and dishwashing test of the investigated embodiments according to the present invention and the comparative examples.

As shown in further tests, the presence of at least 2.5 wt.-% of a silicone oil related to the weight of the burnt covering layer is necessary to ensure the deep-drawing suitability of the non-stick coatings according to the present invention.

Moreover, Table 1 shows that even without the additional presence of a silicone resin in the covering layer (exemplary embodiment 3 and 4) good average results can be achieved in the combined baking and dishwashing test, which are quite comparable with the two comparative examples 1 and 2 according to prior art.

The addition of silicone resins in the covering layer according to the present invention can considerably improve the results of the combined baking and dishwashing tests.

TABLE 1

|  |  | Cycle 1 | Cycle 2 | Cycle 3 | Cycle 4 | Cycle 5 | Cycle 6 | Cycle 7 | Cycle 8 | Cycle 9 | Cycle 10 | Sub-total | Weight | Total | Sum of totals |
|---|---|---|---|---|---|---|---|---|---|---|---|---|---|---|---|
| Ex. 1 | demolding | 10 | 7.5 | 10 | 5 | 7.5 | 5 | 10 | 7.5 | 10 | 5 | 77.5 | 0.6 | 46.5 | 78.5 |
|  | cleaning | 10 | 7.5 | 10 | 7.5 | 7.5 | 7.5 | 7.5 | 7.5 | 7.5 | 7.5 | 80.0 | 0.4 | 32.0 |  |
| Ex. 2 | demolding | 10 | 5 | 10 | 7.5 | 10 | 5 | 5 | 5 | 7.5 | 5 | 70.0 | 0.6 | 42.00 | 72 |
|  | cleaning | 10 | 7.5 | 10 | 7.5 | 7.5 | 7.5 | 7.5 | 5 | 5 | 7.5 | 75.0 | 0.4 | 30.00 |  |
| Ex. 3 | demolding | 2.5 | 7.5 | 2.5 | 2.5 | 5 | 2.5 | 2.5 | 2.5 | 5 | 2.5 | 35.0 | 0.6 | 21.00 | 40 |
|  | cleaning | 5 | 5 | 5 | 5 | 5 | 5 | 2.5 | 5 | 5 | 5 | 47.5 | 0.4 | 19.00 |  |
| Ex. 4 | demolding | 10 | 7.5 | 2.5 | 2.5 | 5 | 2.5 | 2.5 | 2.5 | 5 | 2.5 | 42.5 | 0.6 | 25.50 | 45.5 |
|  | cleaning | 10 | 5 | 5 | 5 | 5 | 5 | 2.5 | 2.5 | 5 | 5 | 50.0 | 0.4 | 20.00 |  |
| Comparative Ex. 1 | demolding | 10 | 5 | 7.5 | 2.5 | 5 | 2.5 | 2.5 | 2.5 | 5 | 5 | 47.5 | 0.6 | 10 | 51.5 |
|  | cleaning | 10 | 7.5 | 5 | 5 | 5 | 5 | 2.5 | 5 | 5 | 7.5 | 57.5 | 0.4 | 10 |  |
| Comparative Ex. 2 | demolding | 10 | 5 | 5 | 2.5 | 2.5 | 2.5 | 2.5 | 2.5 | 5 | 2.5 | 40.0 | 0.6 | 10 | 42 |
|  | cleaning | 10 | 5 | 5 | 5 | 2.5 | 2.5 | 2.5 | 2.5 | 5 | 5 | 45.0 | 0.4 | 10 |  |

What we claim is:

1. A non-stick coating for an article, wherein the non-stick coating comprises:
at least a base layer burnt onto a surface of the article resulting in a burnt base layer, and
a covering layer burnt above the base layer resulting in a burnt covering layer, wherein the base layer having a weight, has a dry film thickness of 1 to 25 μm, wherein the covering layer having a weight, has a dry film thickness of 1 to 4 μm,
wherein the non-stick coating is deep-drawable,
wherein the base layer comprises:
10 to 100 wt.-% of a thermoplastic resin relative to the weight of the burnt base layer, the thermoplastic resin of the base layer having a temperature resistance exceeding 200° C.,
wherein the covering layer comprises:
at least 30 wt.-% of a thermoplastic resin relative to the weight of the burnt covering layer, the thermoplastic resin of the covering layer having a temperature resistance exceeding 200° C.,
at least 2.5 wt.-% of a silicone oil relative to the weight of the burnt covering layer, and optionally, a silicone resin,
wherein the base layer and the covering layer are free of perfluorinated and polyfluorinated alkyl compounds.

2. The non-stick coating according to claim 1, wherein the silicone oil has a kinematic viscosity at 20° C. of at least 100 mm$^2$s$^{-1}$.

3. The non-stick coating according to claim 1, wherein the covering layer contains the silicone resin, wherein the silicone resin constitutes 1 to 67.5 wt.-% relative to the weight of the burnt covering layer.

4. The non-stick coating according to claim 3, wherein the silicone resin is a methyl silicone resin, a phenyl silicone resin and/or a methyl phenyl silicone resin.

5. The non-stick coating according to claim 1, wherein the thermoplastic resin of the base layer and of the covering layer, respectively, is independently selected from the group consisting of polyethersulfone (PES), polyphenylene ether sulfone (PPSU), liquid crystalline polymer (LCP), polyarylether ketone, polyether ketone (PEK), polyether ether ketone (PEEK), polyether ketone ketone (PEKK), polyphenylene sulfide (PPS) and mixtures thereof.

6. The non-stick coating according to claim 1, wherein the base layer and/or the covering layer comprise(s) at least one additive selected from the group consisting of pigments, fillers and metallic particles.

7. The non-stick coating according to claim 1, wherein the dry film thickness of the base layer is 3 to 4 µm.

8. The non-stick coating according to claim 1, wherein the covering layer comprises a different thermoplastic resin than the base layer.

9. The non-stick coating according to claim 2, wherein the covering layer contains the silicone resin, wherein the silicone resin constitutes 1 to 67.5 wt.-% relative to the weight of the burnt covering layer.

10. A coated article comprising the surface provided with the non-stick coating according to claim 1.

11. The coated article according to claim 10, wherein the article is a baking pan.

12. The coated article according to claim 10, wherein the article is a household or utility item.

13. The non-stick coating according to claim 9, wherein the silicone resin is a methyl silicone resin, a phenyl silicone resin and/or a methyl phenyl silicone resin.

14. The non-stick coating according to claim 9, wherein the thermoplastic resin of the base layer and of the covering layer, respectively, is independently selected from the group consisting of polyethersulfone (PES), polyphenylene ether sulfone (PPSU), liquid crystalline polymer (LCP), polyarylether ketone, polyether ketone (PEK), polyether ether ketone (PEEK), polyether ketone ketone (PEKK), polyphenylene sulfide (PPS) and mixtures thereof.

15. A method for applying the non-stick coating of claim 1, wherein
the base layer to be formed is applied as a liquid varnish onto the surface of the article and subsequently dried at 250 to 440° C. resulting in a predried base layer, and subsequently, the covering layer is applied as liquid varnish onto the predried base layer and the base layer and covering layer are bonded to each other and to the surface of the article via a subsequent heat treatment at 250 to 440° C.

16. The method according to claim 15, wherein the varnish used to form the base layer or the covering layer comprises the thermoplastic resin in form of a dispersion.

17. The method according to claim 15, wherein the varnish used to form the base layer or the covering layer comprises the thermoplastic resin in dissolved form.

18. The method according to claim 15, wherein the surface of the article is metallic.

19. The method according to claim 15, wherein the varnish used to form the base layer and the varnish used to form the covering layer are applied via a coil coating process.

20. The method according to claim 15, wherein the non-stick coating is subjected to a forming process after the subsequent heat treatment.

\* \* \* \* \*